United States Patent
Bales et al.

(10) Patent No.: US 9,849,864 B2
(45) Date of Patent: Dec. 26, 2017

(54) VEHICLE PARKING ASSIST SYSTEM

(71) Applicant: Ford Global Technologies, LLC, Dearborn, MI (US)

(72) Inventors: John Bales, Canton, MI (US); Michael Hafner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 14/814,855

(22) Filed: Jul. 31, 2015

(65) Prior Publication Data
US 2017/0028970 A1    Feb. 2, 2017

(51) Int. Cl.
*B60T 7/22*    (2006.01)
*B60T 8/17*    (2006.01)

(52) U.S. Cl.
CPC .............. *B60T 7/22* (2013.01); *B60T 8/1708* (2013.01); *B60T 2201/022* (2013.01); *B60T 2201/10* (2013.01)

(58) Field of Classification Search
CPC .... B60T 7/22; B60T 2201/022; B60T 8/1708; B60T 2201/10
See application file for complete search history.

(56) References Cited

U.S. PATENT DOCUMENTS

| | | | |
|---|---|---|---|
| 5,919,241 A | 7/1999 | Bolourchi et al. | |
| 6,122,579 A | 6/2000 | Collier-Hallman et al. | |
| 6,370,459 B1 | 4/2002 | Phillips | |
| 6,539,288 B2 | 3/2003 | Ishida et al. | |
| 6,631,781 B2 | 10/2003 | Williams et al. | |
| 7,039,504 B2 | 5/2006 | Tanaka et al. | |
| 7,117,077 B2 | 10/2006 | Michi et al. | |
| 7,165,820 B2 | 1/2007 | Rudd, III | |
| 7,546,191 B2 | 6/2009 | Lin et al. | |
| 7,904,222 B2 | 3/2011 | Lee et al. | |
| 8,020,657 B2 | 9/2011 | Allard et al. | |
| 8,169,341 B2 | 5/2012 | Toledo et al. | |
| 8,406,956 B2 | 3/2013 | Wey et al. | |
| 8,427,288 B2 | 4/2013 | Schofield et al. | |
| 8,430,792 B2 | 4/2013 | Noll | |
| 8,464,829 B2 | 6/2013 | Von Tardy-Tuch et al. | |

(Continued)

FOREIGN PATENT DOCUMENTS

| DE | 102005043466 A1 | 3/2007 |
|---|---|---|
| EP | 0842841 B1 | 5/2002 |

(Continued)

OTHER PUBLICATIONS

Sh.Azadi et al., Automatic Parking of an Articulated Vehicle Using ANFIS, Global Journal of Science, Engineering and Technology, GJEST Publishing, 2013, Issue 14, 2013, pp. 93-104.

(Continued)

*Primary Examiner* — Richard Camby
(74) *Attorney, Agent, or Firm* — Raymond L. Coppiellie; Price Heneveld LLP

(57) ABSTRACT

A parking assist system for a vehicle is provided that includes a brake system having at least one wheel count encoder configured to output a wheel count signal and a controller configured to limit a velocity of the vehicle in a first mode. The controller is also configured to stop the vehicle at a target location in a second mode, and prevent overshoot of the target location by the vehicle in a third mode.

10 Claims, 4 Drawing Sheets

(56) References Cited

U.S. PATENT DOCUMENTS

| | | |
|---|---|---|
| 8,521,364 B2 | 8/2013 | Hueger et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,823,796 B2 | 9/2014 | Shen et al. |
| 8,888,120 B2 | 11/2014 | Trevino |
| 8,909,426 B2 | 12/2014 | Rhode et al. |
| 8,948,990 B2 | 2/2015 | Kobayashi et al. |
| 9,102,271 B2 | 8/2015 | Trombley et al. |
| 9,132,856 B2 | 9/2015 | Shepard |
| 9,208,686 B2 | 12/2015 | Takamatsu |
| 9,248,858 B2 | 2/2016 | Lavoie et al. |
| 2005/0206225 A1 | 9/2005 | Offerle et al. |
| 2006/0244579 A1 | 11/2006 | Raab |
| 2007/0057816 A1 | 3/2007 | Sakakibara et al. |
| 2009/0132143 A1* | 5/2009 | Kamiya .............. B60T 7/12 701/96 |
| 2012/0224059 A1 | 9/2012 | Takamatsu |
| 2012/0271522 A1 | 10/2012 | Rupp et al. |
| 2012/0283909 A1 | 11/2012 | Dix |
| 2012/0316732 A1 | 12/2012 | Auer |
| 2013/0103246 A1 | 4/2013 | Staack |
| 2013/0238193 A1 | 9/2013 | Bolourchi et al. |
| 2014/0121883 A1 | 5/2014 | Shen et al. |
| 2014/0121930 A1 | 5/2014 | Allexi et al. |
| 2014/0267727 A1 | 9/2014 | Alaniz |
| 2015/0012202 A1 | 1/2015 | Moore et al. |
| 2015/0025732 A1 | 1/2015 | Min et al. |
| 2015/0061365 A1* | 3/2015 | Sakashita .............. B60T 7/042 303/15 |
| 2015/0158524 A1 | 6/2015 | Lee et al. |
| 2015/0191200 A1 | 7/2015 | Tsubaki et al. |
| 2015/0217692 A1 | 8/2015 | Yanagawa |
| 2015/0232092 A1 | 8/2015 | Fairgrieve et al. |
| 2015/0274202 A1 | 10/2015 | Tsunoda et al. |

FOREIGN PATENT DOCUMENTS

| | | |
|---|---|---|
| EP | 1006042 B1 | 4/2006 |
| EP | 1655191 A1 | 5/2006 |
| EP | 2213546 A1 | 8/2010 |
| GB | 2496298 A | 5/2013 |
| JP | 649063 A | 1/1989 |
| JP | 2002337717 A | 11/2002 |
| JP | 2003261053 A | 9/2003 |
| JP | 2009113512 A | 5/2009 |
| KR | 20110114897 A | 4/2010 |
| KR | 1020140004411 A | 1/2014 |
| KR | 1020150038776 A | 4/2015 |

OTHER PUBLICATIONS

Cuesta et al., Intelligent System for Parallel Parking of Cars and Tractor-Trailers, Intelligent Mobile Robot Navigation, Star 16, Springer-Verlag Berlin Heidelberg 2006, pp. 159-188.

* cited by examiner

VEHICLE PARKING ASSIST SYSTEM

FIELD OF THE INVENTION

The present disclosure generally relates to systems for controllably assisting with the parking of a vehicle. In particular, various systems are disclosed which minimize or eliminate overshoot of the vehicle to a target location.

BACKGROUND OF THE INVENTION

Automatic parking an automotive vehicle in a target parking location may be challenging due to unexpected disturbances present which can hinder the longitudinal control of the vehicle. These disturbances may be exacerbated while towing a trailer. The unexpected disturbances along the parking path of the vehicle may lead to undershoot or overshoot of the desired final location of the vehicle.

SUMMARY OF THE INVENTION

According to one aspect of the present disclosure, a parking assist system for a vehicle is provided that includes a brake system having at least one wheel count encoder configured to output a wheel count signal and a controller configured to limit a velocity of the vehicle in a first mode. The controller is also configured to stop the vehicle at a target location in a second mode, and prevent overshoot of the target location by the vehicle in a third mode.

According to another aspect of the present disclosure, a parking assist system for a vehicle is provided that includes a parking aid controller, a vehicle communication bus and a scheduler in electrical communication with the parking aid controller and the vehicle communication bus. The scheduler is configured to output feedback signals to a control module and the control module is configured to output a brake torque to stop the vehicle at a target location.

According to another aspect of the present disclosure, a method for assisting in parking a vehicle is provided that includes the steps of initiating a parking sequence having a reference velocity, altering a velocity of the vehicle to about the reference velocity by generating a brake torque during a first mode of operation of a controller, outputting the brake torque to a disturbance estimator, storing the brake torque within the disturbance estimator, and utilizing the brake torque from the disturbance estimator in a second mode of operation of the controller to stop the vehicle at a target location.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
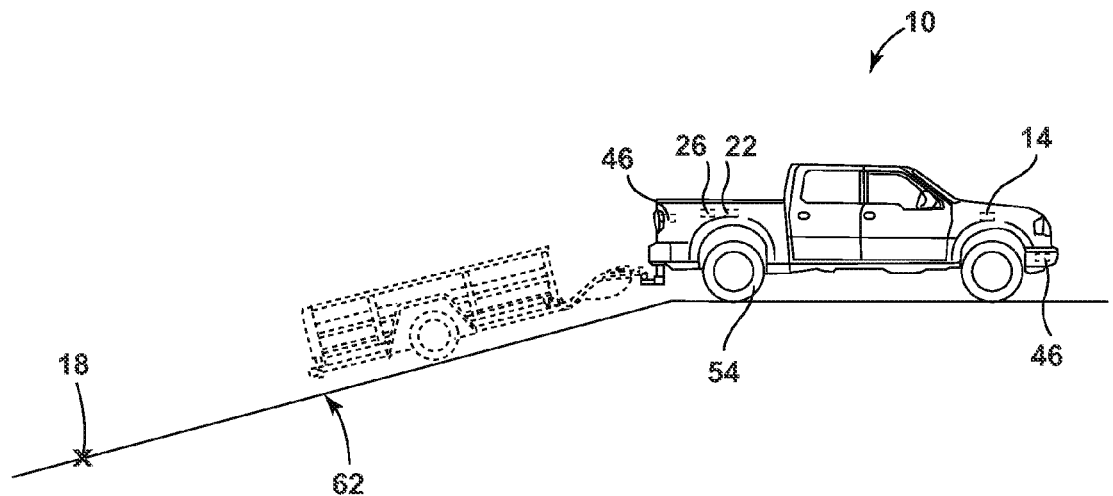
FIG. 1 is a side perspective view of a vehicle at one location in a parking maneuver according to one embodiment.

Referring to FIGS. 1-4B, reference numeral 10 generally designates an automotive wheeled vehicle that includes a parking assist system 14 for assisting in parking the vehicle 10 at a target location 18. The parking assist system 14 includes a brake system 22 having at least one wheel count encoder 26, a parking aid controller 30, a vehicle controller area network (CAN) 34, a scheduler 38, and a control module 42. The vehicle CAN 34 may also be known as a vehicle communication bus. Positioned at a rear of the vehicle 10 are one or more ultrasonic sensors 46 capable of emitting sound waves in the ultrasonic and near-ultrasonic frequency, which may be used for sensing objects in front of and behind the vehicle 10. The brake system 22 may be an anti-lock brake system having one or more anti-lock brake modules positioned proximate the wheels 54 of the vehicle 10. The wheel count encoder 26 may be used to count the number of revolutions a particular wheel 54 undergoes and outputs a signal to the vehicle CAN 34. The parking aid controller 30 may be used to assist in the automatic parking of the vehicle 10 at the target location 18, as described in greater detail below.

Figure 2:
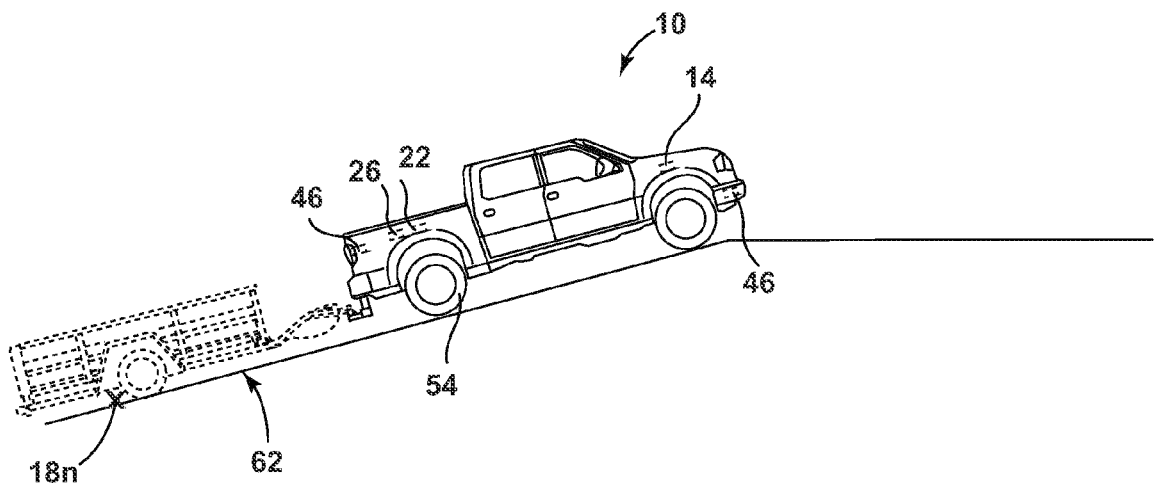
FIG. 2 is a side perspective view of a vehicle at another location in a parking maneuver according to one embodiment.

Referring to FIGS. 1 and 2, the vehicle 10 is shown in an exemplary parking scenario in which a driver of the vehicle 10 is attempting to park the vehicle 10 at the target location 18 positioned on a hill 62 while backing up the vehicle 10. Parking of the vehicle 10 may be carried out using the parking assist system 14, which is generally configured to assist a driver of the vehicle 10 in various ways in parking the vehicle 10. It will be understood that although depicted in a backward parking maneuver, the parking assist system 14 may also be used in forward parking scenarios of the vehicle 10. Additionally, in various embodiments, automatic parking of the vehicle 10 with the parking assist system 14 may be carried out while the vehicle 10 is towing or pushing an object (e.g., a trailer, camper, etc.) without departing from the scope of the disclosure. In one example, the parking assist system 14 can include both actions carried out by the driver of the vehicle 10 as well as by the system 14. In particular, the driver may initiate the parking assist system 14 after driving the vehicle 10 along a path to a desired location at which the parking maneuver is to begin. Once the parking system 14 is activated, the driver may select the target location 18 where the vehicle 10 will be parked, for example, via a screen, display, or control surface (e.g., buttons or knobs) to indicate to the parking assist system 14 where the driver wishes the vehicle 10 to be parked. The parking assist system 14 may cause the vehicle 10 to steer automatically, such as by control of an electronic power assisted steering ("EPAS") system, to implement turning maneuvers determined to be appropriate for parking the vehicle 10 and/or trailer.

In conventional systems, longitudinal motion of the vehicle 10 may be the responsibility of the driver, but this can be a taxing experience and the driver may attempt to accelerate the vehicle 10 faster than allowably safe speeds. Additionally, the driver may encounter situations where atypical forces are acting on the vehicle 10 during parking. For example, situations such as that depicted in FIG. 2, where the target location 18 for parking is positioned on a hill 62, may be particularly difficult for the driver due to the requirement that additional throttle or brake must be applied relative to level ground parking maneuvers. Accordingly, systems such as the parking assist system 14 can include the scheduler 38 and the control module 42 to control the longitudinal motion of the vehicle 10 by automatically applying the brakes via an input to the brake system 22.

Figure 3:
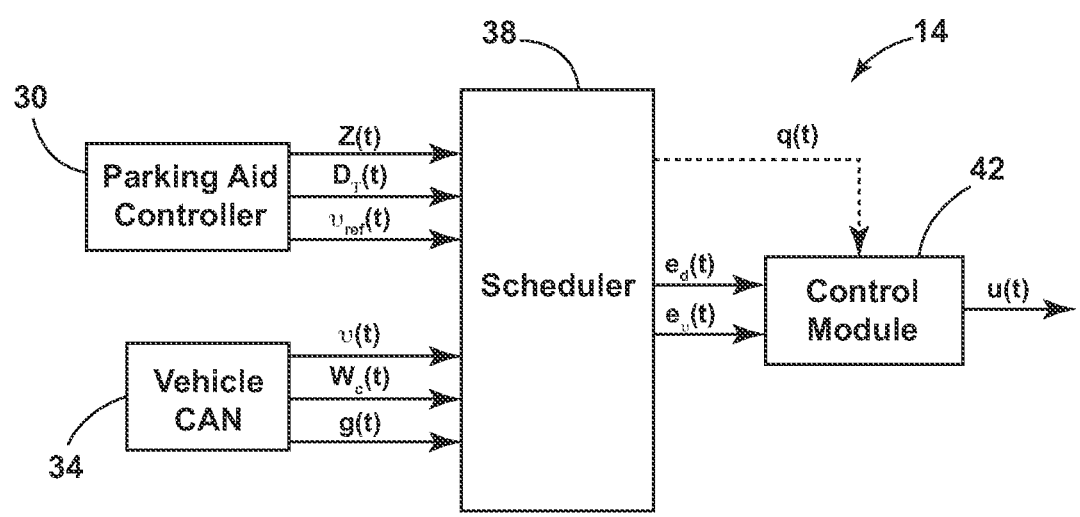
FIG. 3 is a block diagram illustrating a parking assist system according to one embodiment.

Referring now to FIG. 3, the parking aid controller 30, vehicle CAN 34, scheduler 38 and the control module 42 may all include control circuitry such as a microprocessor and a memory unit, according to one embodiment. The memory of the parking aid controller 30, the vehicle CAN 34, the scheduler 38 and the control module 42 may include random access memory (RAM), read-only memory (ROM), and electrically erasable programmable read-only memory (EEPROM). The memory may contain a routine specific to the component to which it is attached, which may also be integrated in various memory units in various locations and components of the vehicle 10. The microprocessor of the parking aid controller 30, vehicle CAN 34, scheduler 38 and the control module 42 operate their respective routines stored in respective memory in order to operate.

Referring now to FIG. 3, some of the components of the parking system 14 are shown schematically. Specifically, the embodiment shown depicts the parking aid controller 30 and the vehicle CAN 34 providing a plurality of data inputs to the scheduler 38, which then provides data inputs to the control module 42. The parking aid controller 30 and the vehicle CAN 34 are shown in electrical connection with the scheduler 38, which in turn is in electrical communication with the control module 42. The parking aid controller 30 is designed to input parking specific data to the scheduler 38, while the vehicle CAN 34 is configured to input data about the state of the vehicle 10 to the scheduler 38. The vehicle CAN 34 serves as a data communication bus for transmitting and sharing data. The parking aid controller 30 serves as the interface to raw sensor data and creates a localized coordinate system for parking maneuvers. The parking aid controller 30 is configured to provide a zone data signal $Z(t)$, a distance to the target location signal $D_T(t)$, and a reference velocity $V_{ref}(t)$ at which the vehicle should be moving during the parking maneuver. The zone data signal $Z(t)$ provides data from the ultrasonic sensors 46 to alert the system 14 of obstacles between the vehicle 10 and the target location 18. The vehicle relative target distance signal $D_T(t)$ gives the distance between the vehicle 10 and the target location 18 at a given point in time. The vehicle relative target distance signal $D_T(t)$ changes with time as a distance to the target $D_T$ and vehicle 10 changes. Additionally, in the event that an obstacle enters the path of the vehicle 10 during a parking maneuver, the target location 18 is changed to the location of the obstacle (i.e. shortening the distance to the target $D_T$) and the vehicle relative target distance signal $D_T(t)$ is updated to correspond to the distance between the vehicle 10 and the obstacle. The reference velocity $V_{ref}(t)$ is the velocity at which the vehicle 10 should be moving based on the commands from the parking aid controller 30. The reference velocity $V_{ref}(t)$ may change over time as the vehicle 10 moves though the parking maneuver. The vehicle CAN 34 may input a vehicle velocity signal $v(t)$, a wheel count data signal $W_c(t)$, and a gear signal $g(t)$ to the scheduler 38 indicating which gear the vehicle 10 is in. The wheel count data signal $W_c(t)$ may be determined from the wheel count encoder 26.

During operation, the scheduler 38 functions both as an estimator of the state of the vehicle 10 (e.g., moving forward or reverse) and a controller scheduler. While estimating the state of the vehicle 10, the scheduler 38 may perform four main tasks: wheel count to distance estimation, determination of a powertrain reference velocity, ultrasonic target detection, and determination of a distance error signal $e_d(t)$ and a velocity error signal $e_v(t)$. During wheel count to distance estimation, the scheduler 38 tracks the distance traveled $d_t(t)$ by the vehicle 10 by combining the total angular displacement of the wheel 54, as computed with the wheel count data $W_c(t)$, with the radius of the wheel 54.

Both the distance error signal $e_d(t)$ and the velocity error signal $e_v(t)$ may be computed differently depending on the operation of the control module 42, or the detection of an object or obstacle between the vehicle 10 and the target location 18. The distance error signal $e_d(t)$ and the velocity error signal $e_v(t)$ may be signals capable of use in feedback style controllers. During the generation of the distance error signal $e_d(t)$, the scheduler 38 uses both the distance traveled $d_t(t)$ by the vehicle 10 and the target distance $D_T$ to produce the distance error signal $e_d(t)$ by subtracting the distance traveled $d_t(t)$ from the vehicle relative target distance signal $D_T(t)$. Additionally or alternatively, the scheduler 38 may compute the distance error signal $e_d(t)$ when an object or obstacle is detected by the ultrasonic sensors 46 between the vehicle 10 and the target location 18 by using both zone data signal $Z(t)$ and the wheel count data $W_c(t)$. For example, the scheduler 38 may smooth the quantized zone data of the zone data signal $Z(t)$ using the wheel count data $W_c(t)$ to provide the control module 42 with a smooth distance error signal $e_d(t)$. In such a situation, the distance error signal $e_d(t)$ is set equal to a distance between the vehicle 10 and the obstacle (e.g., the zone data signal $Z(t)$). By using the smaller distance error signal $e_d(t)$ produced by the aforementioned methods, the vehicle 10 can be ensured to not make unintended contact with the obstacle or overshoot the target location 18.

The scheduler 38 also converts the reference velocity $V_{ref}(t)$ and the vehicle velocity $v(t)$ into a velocity error signal $e_v(t)$ by subtracting the vehicle velocity $v(t)$ from the reference velocity $V_{ref}(t)$ or it may be calculated by subtracting the vehicle velocity $v(t)$ from 0. The distance error signal $e_d(t)$ and the velocity error signal $e_v(t)$ are then input into the control module 42. When the scheduler 38 is functioning as a controller scheduler, the scheduler 38 outputs a mode switch signal $q(t)$ which chooses which mode the control module 42 is in.

Figure 4A:
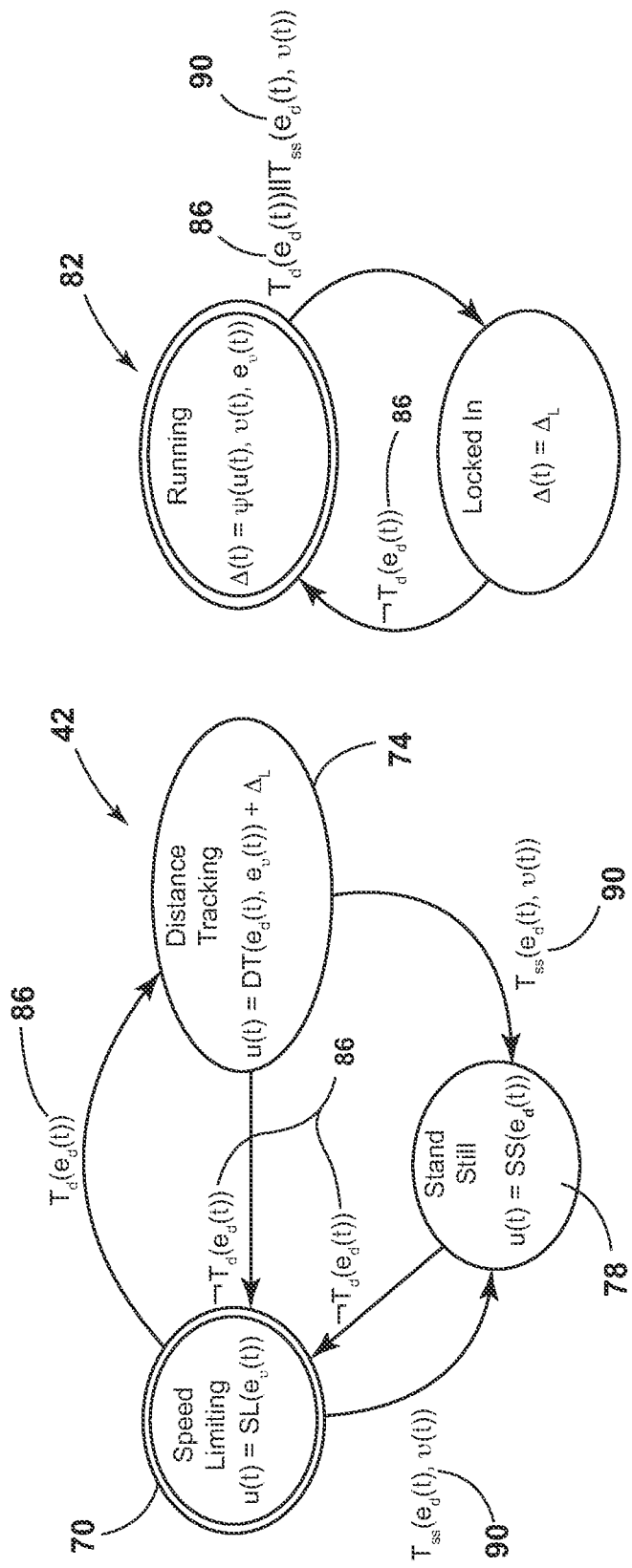
FIG. 4A is a schematic state diagram of the operation of a control module according to one embodiment.
Figure 4B:
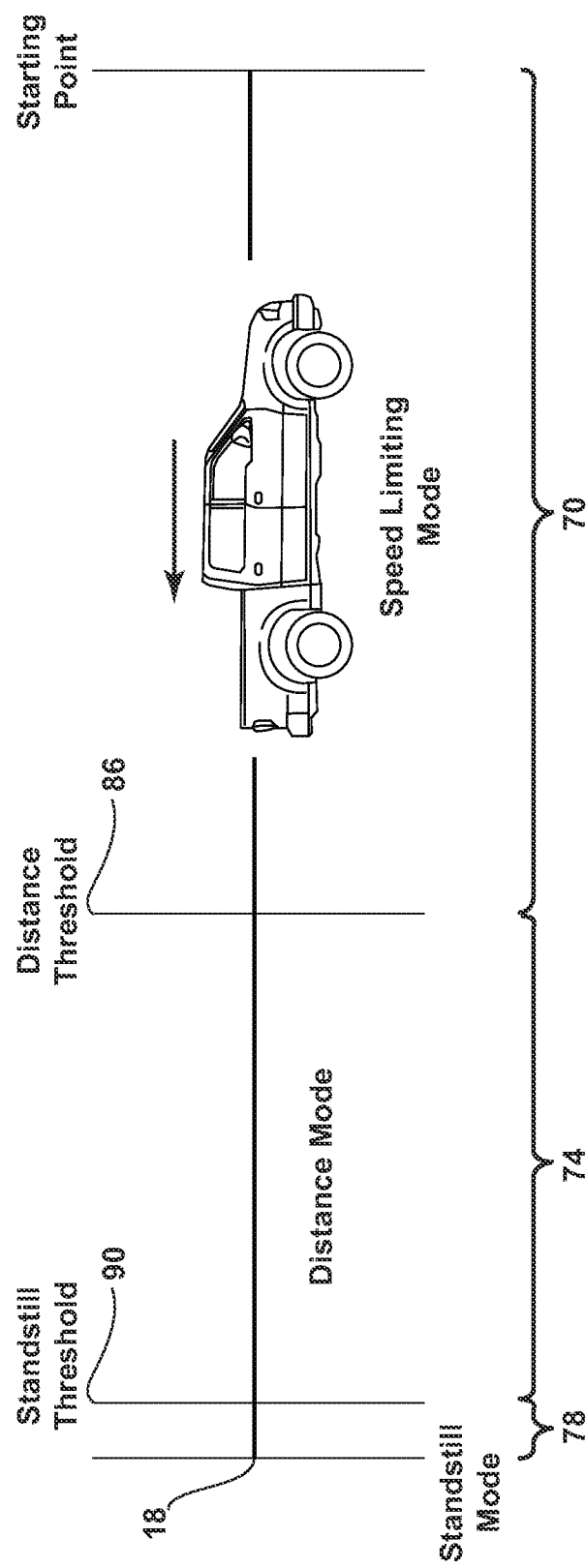
FIG. 4B is a pictorial representation of the operation of the control module of FIG. 4A, according to one embodiment.

Referring now to FIGS. 3-4B, the control module 42 may be operated in a plurality of modes which function on the distance and velocity error signals $e_d(t)$, $e_v(t)$ and may be switched via mode switch signal $q(t)$ issued from the scheduler 38. The control module 42 is capable of operating at least in a speed limiting mode 70, a distance tracking mode 74 and a stand still mode 78. Operating during use of the control module 42 is a disturbance estimator 82. The disturbance estimator 82 is used to compensate for disturbances experienced by the vehicle 10 during parking maneuvers. The control module 42, regardless of the mode it is in, is configured to output a deceleration request $u(t)$ configured to slow the movement of the vehicle 10. The deceleration request $u(t)$ may control the brake system 22 and/or the output of the powertrain (e.g., engine braking) of the vehicle 10 to brake the vehicle 10 and then affect a slowing of the vehicle 10.

Referring now to FIGS. 4A and 4B, the control module 42 begins parking maneuvers in the speed limiting mode 70. In the speed limiting mode 70, the control module 42 operates through the use of proportional-integral control, and monitors the velocity error signal $e_v(t)$ output by the scheduler 38. The control module 42, in the speed limiting mode 70, initially works with the powertrain of the vehicle 10 to control the idle speed of the engine or motor of the vehicle 10 to reduce the vehicle velocity v(t) and thereby minimize the velocity error signal $e_v(t)$. If management of the output of the powertrain is not sufficient to lower the vehicle velocity v(t) (i.e., lower the velocity error signal $e_v(t)$ sent to the control module 42) to the reference velocity $V_{ref}(t)$ within a predetermined time frame, the control module 42 may actuate the brake system 22 to slow the vehicle 10. The brake system 22 in turn applies braking force, which reduces the vehicle velocity v(t), thereby decreasing the velocity error signal $e_v(t)$. For the purposes of speed limiting mode 70 within a system, such as the parking assist system 14, the desired response is a system that quickly limits the vehicle velocity v(t) to the reference velocity $V_{ref}(t)$ with very little velocity overshoot. It is noted that minimizing velocity overshoot overall, as opposed to simply reducing velocity overshoot quickly, is desired, as the vehicle velocity v(t) is desirably maintained below the EPAS cutout speed, for example, at all times, but flexibility through increased speed availability may also be desired.

Working closely with the speed limiting mode 70 and the distance tracking mode 74 is the disturbance estimator 82. Upon activation of the speed limiting mode 70, the disturbance estimator 82 is initialized and begins running. While the disturbance estimator is running it utilizes the deceleration request u(t) determined by the speed limiting mode 70, the vehicle velocity v(t), and the velocity error signal $e_v(t)$, to determine a brake torque Δ(t) required to keep the vehicle velocity v(t) at a steady state. The function psi ψ represents that once the speed limiting mode 70 brings the difference between the vehicle velocity v(t) and the reference velocity $V_{ref}(t)$ to a sufficiently small magnitude for a configurable amount of time, the brake torque Δ(t) of the speed limiting mode 70 is locked within the disturbance estimator 82 as a locked in brake torque $Δ_L$. Psi ψ may evaluate to 0 or a previous value of the deceleration request u(t) prior to expiration of the configurable time, or may evaluate to the deceleration request u(t) once the configurable time has passed. In other words, the required amount of brake force required to keep the vehicle 10 from accelerating during a parking maneuver due to a disturbance is saved, or locked in, by the disturbance estimator 82 for later use with the distance tracking mode 74. Additionally, passing of the distance threshold 86 or the standstill threshold 90 may trigger the saving or storing of the locked in brake torque $Δ_L$ within the disturbance estimator 82. Exemplary disturbances to the parking of the vehicle 10 may include the target location 18 being located on the hill 62 or on a road with a non-negligible grade. The locked in brake torque $Δ_L$ is then output to the distance tracking mode 74 of the control module 42.

Once the vehicle 10 has crossed a distance threshold 86, the scheduler 38 sends the mode switch signal q(t) to the control module 42 to enter distance tracking mode 74. The distance threshold 86 may be a predetermined and/or configurable distance from the target location 18 as chosen by the driver, the manufacturer of the vehicle, the control module 42 or the scheduler 38. In an exemplary embodiment, the distance threshold 86 may be expressed as the computer logic function $$T_{d(e_d(t))} = \begin{cases} 1 \text{ if } e_d(t) \leq \delta_d, \\ 0 \text{ else} \end{cases} \quad (1)$$

where $e_d(t)$ is the distance error signal and $\delta_d$ represents the distance threshold 86. The distance threshold 86 may be less than about 5 meters, less than about 4 meters, less than about 3 meters, less than about 2 meters, or less than about 1 meter from the target location 18. The distance tracking mode 74 of the control module 42 is responsible for issuing the deceleration request u(t), which brings the vehicle 10 to a complete stop at the target location 18 using the brake system 22 and the locked in brake torque $Δ_L$. The deceleration request u(t) may be based, at least in part, on the distance error signal $e_d(t)$, the velocity error signal $e_v(t)$, and the locked in brake torque $Δ_L$. The distance tracking mode 74 is configured to operate as a proportional-derivative control. In an exemplary embodiment, the distance tracking mode 74 may be in the form of $$u(t) = K_d e_v(t) + K_p e_d(t), \quad (2)$$

wherein u(t) represents the deceleration request, $K_d$ represents a proportional gain (e.g., between about 0.2 and about 5), $K_p$ represents a derivative gain (e.g., between about 0.2 and about 5), $e_d(t)$ represents the distance error signal, and $e_v(t)$ represents the velocity error signal. The distance tracking mode 74 utilizes the distance and velocity error feedback signals $e_d(t)$, $e_v(t)$ until the distance error feedback signal $e_d(t)$ reaches 0. In the distance tracking mode 74, the velocity error $e_v(t)$ is calculated as the negative of the vehicle velocity v(t). The change in how the velocity error $e_v(t)$ is calculated is done such that the vehicle 10 will ultimately come to a stop, not maintain the reference velocity $V_{ref}(t)$. As the distance tracking mode 74 utilizes the locked in brake torque $Δ_L$ stored by the disturbance estimator 82, the distance tracking mode 74 has nearly perfect distance tracking leading to little or no overshoot of the target location 18.

The standstill mode 78 is designed to prevent the vehicle 10 from overshooting the target location 18, or prevent contact with an object or obstacle proximate the vehicle 10. The scheduler 38 switches the control module 42 to standstill mode 78 when the scheduler 38 detects the vehicle 10 is likely to pass through a standstill threshold 90, that overshoot of the target location 18 is likely to occur, or contact with an object or obstacle proximate the vehicle 10 is imminent (e.g., via the zone data signal Z(t)). In the standstill mode 78, the control module 42 instructs the brake system 22 to increase braking force in an inversely proportional relationship to the distance error signal $e_d(t)$. In a specific embodiment, the standstill mode 78 may be a static function such as $$u(t) = \frac{g_{ss}}{\max\{e_d(t), o_{ss}\}}, \quad (3)$$

wherein u(t) is the deceleration request, $g_{ss}$ is a stand still gain (e.g., between about 0.1 and about 5), and the maximum values of the distance error signal $e_d(t)$ and a stand still offset $o_{ss}$ (e.g., between about 0.05 and about 0.5) are taken. The stand still gain $g_{ss}$ value of function (3) allows for changes to the intensity and maximum values of deceleration request u(t) output by the stand still mode 78.

As explained above, the scheduler 38 is responsible for switching the control module 42 between the modes 70, 74, 78. The control module 42 is initialized in the speed limiting mode 70, and adjusts the speed of the vehicle 10 to approximately that of the reference velocity $V_{ref}(t)$. The control module 42 switches modes to the distance tracking mode 74 from the speed limiting mode 70 when the vehicle 10 passes the distance threshold 86, as represented by $T_d(e_d(t))$. The transition from the distance tracking mode 74 to the stand still mode 78 is initiated at the standstill threshold 90. The standstill threshold 90 may be a threshold of a predetermined function of the distance error $e_d(t)$ and the vehicle velocity v(t) which indicates to the scheduler 38 and/or the control module 42 that the vehicle 10 is sufficiently close to the target location 18, that overshoot of the target location 18 is likely or imminent or that contact with an object or obstacle is imminent. This is illustrated as $T_{ss}(e_d(t), v(t))$ to indicate that the standstill threshold 90 is a function of the distance error $e_d(t)$ and the vehicle velocity v(t). Additionally or alternatively, the standstill threshold 90 may be a predefined distance from the target location 18. In an exemplary embodiment, the standstill threshold 90 may be represented as the computer logic function $$T_{ss}(e_d(t), v(t)) = \begin{cases} 1 & \text{if } v(t) \geq (\delta_s e_d(t) + \delta_o) \\ 0 & \text{else} \end{cases} \quad (4)$$

where v(t) represents the vehicle velocity, $\delta_s$ represents a slope in a position versus velocity space (e.g., between about 0.1 and about 10), $\delta_o$ represents an offset in a position versus velocity space, and $e_d(t)$ represents the distance error signal. The interpretation of function (4) is that the slope $\delta_s$ and offset $\delta_o$ define a line in a position versus velocity space, and if the current distance error $e_d(t)$ and vehicle velocity v(t) are above this line, then an overshoot of the target location 18 is likely and the control module 42 will transition to standstill mode 78.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature, unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length and width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A parking assist system for a vehicle, comprising:
    a brake system having at least one wheel count encoder configured to output a wheel count signal; and
    a controller configured to limit a velocity of the vehicle in a first mode, configured to stop the vehicle at a target location in a second mode, and configured to prevent overshoot of the target location by the vehicle in a third mode by outputting a brake torque inversely proportional to a calculated distance to the target stop location of the vehicle.

2. The parking assist system of claim 1, further comprising a scheduler configured to convert the wheel count signal into a linear distance traveled by the vehicle.

3. The parking assist system of claim 2, wherein the second mode of the controller is operated in a proportional-derivative control based on a distance error signal.

4. The parking assist system of claim 1, wherein the controller is configured to transition from the first mode to the second mode at a predetermined distance threshold from the target location.

5. The parking assist system of claim 4, wherein the third mode of the controller is configured to stop the vehicle at the target location with essentially no overshoot.

6. A parking assist system for a vehicle, comprising:
    a scheduler in electrical communication with a parking aid controller and a vehicle communication bus and configured to output feedback signals to a control module configured to operate in a first, a second and a third mode, wherein the control module in the third mode is configured to output a brake torque inversely proportional to a calculated distance to a target stop location of the vehicle.

7. The parking assist system of claim 6, wherein the first mode is operated in a proportional-integral control based on a velocity error signal.

8. The parking assist system of claim 7, wherein the second mode of the control module is configured to be operated in a proportional-derivative control based on a distance error signal.

9. The parking assist system of claim 8, wherein the second mode of the control module is configured to stop the vehicle at the target location.

10. The parking assist system of claim 6, wherein the feedback signals include at least a distance error signal and a velocity error signal.

\* \* \* \* \*